Aug. 2, 1932.    A. DEWANDRE    1,869,956
SERVO BRAKE
Original Filed Sept. 14, 1925    3 Sheets-Sheet 1

Inventor:
Albert Dewandre
By
Attorney

Aug. 2, 1932.  A. DEWANDRE  1,869,956
SERVO BRAKE
Original Filed Sept. 14, 1925   3 Sheets-Sheet 2

Inventor:
Albert Dewandre
By *[signature]*
Attorney

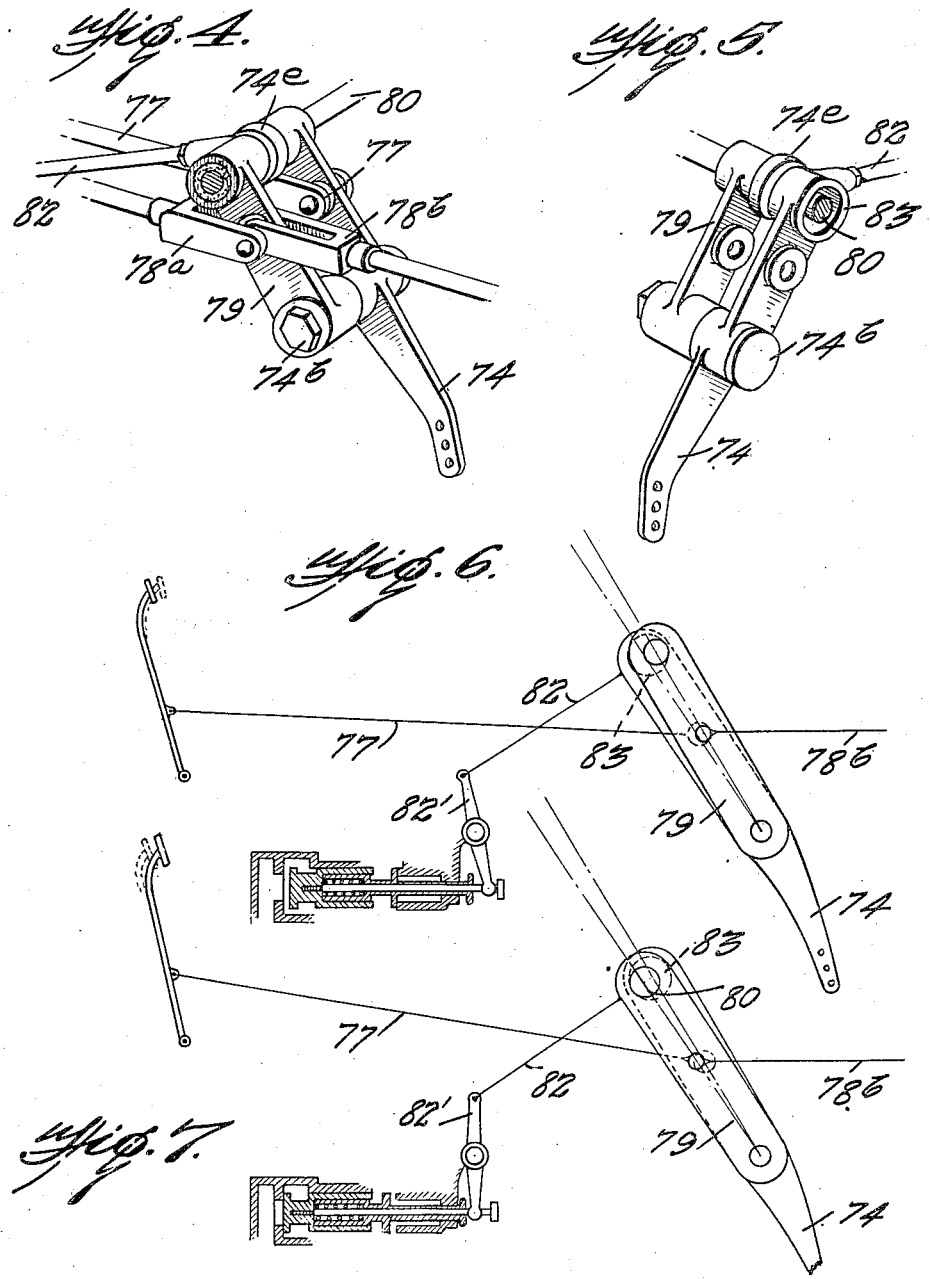

Patented Aug. 2, 1932

1,869,956

UNITED STATES PATENT OFFICE

ALBERT DEWANDRE, OF LIEGE, BELGIUM, ASSIGNOR TO SERVO FREIN DEWANDRE, SOCIETE ANONYME, OF LIEGE, BELGIUM

SERVO-BRAKE

Application filed September 14, 1925, Serial No. 56,320, and in Belgium August 10, 1925. Renewed May 11, 1931.

This invention is directed to servo-brake mechanism, wherein brake application is obtained through movement of a piston subjected to pressure differences, with such pressure differences controlled through a distributor which in turn is governed through relative movement of the manually-operable brake lever or pedal and the brake mechanism.

The main object of the invention is the provision of compact and simple operating mechanism to be initially actuated in part by the manual pedal for the initial control of the distributor to subject the power means to the desired pressure differences, such initially operated part being thereafter directly operated by the power means and acting through a companion part of the operating mechanism to set the brakes, such initially operated part being fulcrumed on the manually-pedal connection during such power movement to reversely affect the distributor to cut off power flow, thereby maintaining the brakes set with that power application determined by the manual movement of the pedal. The operating mechanism is completely flexible, responding to further pedal movement for more power application to the brakes, or to reverse movement of the pedal to release the power application.

Structurally, the present invention provides a compactly arranged and mounted lever mechanism, including a lever and associated link, supported on a common pivot and connected for unit bodily movement beyond the pivot. The lever is mounted for limited play on its pivotal mounting and connected to the distributor operator, to actuate the distributor through such play, being further connected to the power means below its connection with the link and to the manually-operable pedal between such pivot mounting and link connection. The link is connected to the brakes between its pivot mounting and its connection with the lever.

The invention is illustrated in the accompanying drawings, in which:

Figure 4 is a detail perspective view of the essential operating levers.

Figure 5 is a similar view of the levers, looking from the opposite side.

Figure 6 is a diagrammatic view illustrating the position of the parts at the moment pressure is applied to the foot lever to open the vacuum valve.

Figure 7 is a similar view illustrating the position of the parts at the moment pressure is relieved on the foot pedal while the brakes are applied, to open the atmospheric valve to release the brakes.

Figure 1:
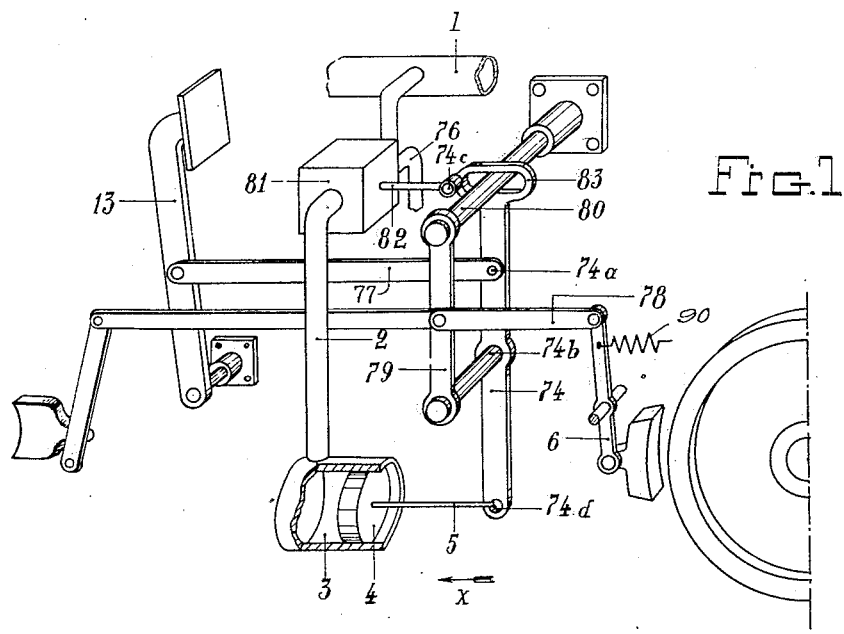
Figure 1 is a diagrammatic perspective view illustrating the improved brake mechanism.

The brake mechanism is indicated by a lever 6 carrying the brake shoe or other applicator to be applied to the wheel. The brake is to be applied by utilizing the partial vacuum created in the suction pipe 1 of the engine, through a duct 2 leading to a cylinder 3.

When the reduction of pressure is created in the cylinder by the suction of the engine, the brakes are applied, and when atmospheric pressure is reestablished in the cylinder the brakes are released. This operation is controlled through a distributor 81, governing the suction lead 2 to the cylinder and also governing a duct 76 by which atmospheric balance is established in the cylinder.

The distributor 81 comprises a suction controlling valve 8, and an atmospheric controlling valve 9, slidably cooperating within an appropriate casing, the stem of the valve 8 passing slidably through the valve 9 and being provided beyond such valve 9 with an adjustable abutment in the form of a nut 44. A spring 11 is arranged between the valves to normally seat said valves when free to act, the valve 9 having an extension beyond the casing. A lever 82' is pivotally mounted on the valve casing, its lower end loosely receiving the stem of the valve 8, so that on movement of the lever 82' in one direction the nut 44 is engaged and the valve 8 opened and valve 9 is still closed, and on movement in the opposite direction, the extension of the valve 9 is engaged and valve 8 is open, and such valve 9 opened, so that both valves cannot open at the same time.

The controlling mechanism comprises a swinging lever 74 mounted at its upper end upon a fixed shaft 80, the cooperating end of the lever being of greater diameter than the sleeve to permit a limited independent movement of the lever relative to the shaft. The swinging lever 74 is connected at a point 74$^a$ below the shaft 80, with the foot pedal or other actuator through a bar 77. Below the connection 74$^a$, the swinging lever 74 is connected, through a pivot pin 74$^b$ with a link 79, said link being pivotally supported on the shaft 80. Below the pivot pin 74$^b$, the swinging lever 74 is connected, preferably at its lower end, to the piston 4, operative in cylinder 3, by a rod or cable connection 5.

Figure 2:
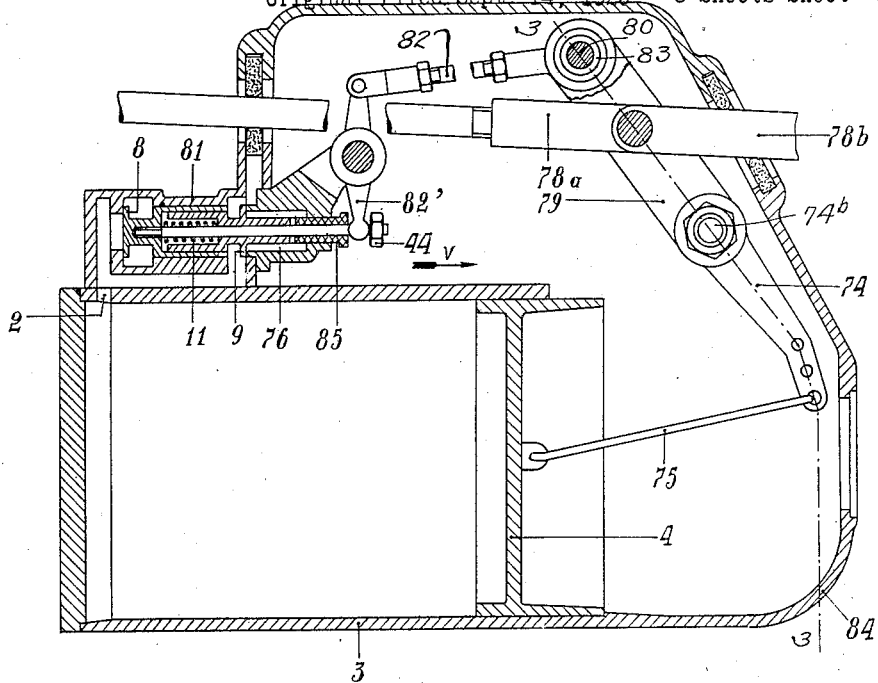
Figure 2 is a section on the line 2—2 of Figure 3.
Figure 3:
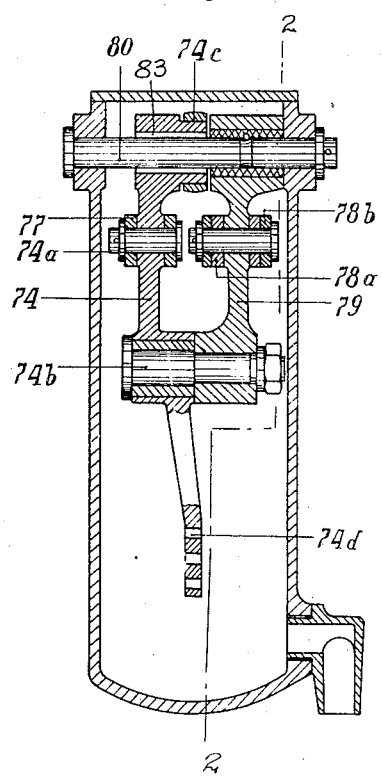
Figure 3 is a section on the line 3—3 of Figure 2.

The brake mechanism lever 6 is connected to the link 79 by a bar 78, which latter, as shown in Fig. 2, may be in two sections 78$^a$ and 78$^b$ to provide connection with and operation of both front and rear brakes. The valve operation lever is connected to the controlling mechanism by an adjustable rod 82, connected at one end to the upper end of such valve controlling lever and formed at the opposite end as a ring 83 to encircle the upper end of the swinging lever 74.

In the act of applying the brakes the foot pedal or other actuator is first moved in a counterclockwise direction, acting through rod 77 to swing lever 74 about its then pivot point 74$^b$. This by reason of the relative and limited freedom of the upper end of the swinging lever, moves the upper end of the valve operating lever 82′ toward the left in Fig. 2, causing the opposite end of this lever 82′ to engage the nut 44 and open valve 8 as shown in Figure 6. Suction is thus admitted to the cylinder 3, moving the piston 4 toward the left. The connection 75 then acts to exert a pull on the lower end of the swinging lever 74, the latter now swinging on the point 74$^a$ as the pivot, such point being relatively fixed through the holding of the foot pedal. As the lever 74 moves in response to piston movement, the lower end of the link 79 is correspondingly moved, applying the brakes.

The swinging movement of lever 74 in response to the piston movement will of course move that end of lever 74 encircling shaft 80 in a direction opposite to its initial movement. This movement of the upper end of lever 74 will, through the connection 82, reverse the initial movement of the valve operating lever and permit valve 8 to close, without, however, opening valve 9. The brakes thus remain in their then set position. Obviously, however, if a more forceful setting of the brakes is desired, the pedal 13 is simply advanced in the same or original direction, and the operation just described will be repeated, applying additional force to the brakes.

The resultant of the pull exerted on the swinging lever 74 at point 74$^d$, and of the resistance of the brake at point 74$^b$, is of course directed through the point 74$^a$ to the pedal 13. This force is in direct opposition to the manual pressure with which the brake pedal is held, thus producing a reaction directly felt by the operator, and being proportional to the braking force in every instance, enables the operator to determine the extent of braking force through such reaction.

If the brake pedal is allowed to return to normal position, the initial action is to permit the upper end of lever 74 to move toward the right in Fig. 2, relative to shaft 80. This, through rod 82, moves the upper end of valve operating lever 82′ toward the right, causing the lower end of such lever to open valve 9 as shown in Figure 7. During the short period of time required for opening valve 9, the vacuum acts on the piston and swings lever 74 slightly on pivot 74$^b$, carrying with it the link 79 which rocks on the pivot 80, but immediately the brake springs 90 come into play and pulling on link 78, link 79 and pivot 74$^b$, returns the parts to normal position and thus releases the brakes. In the action of the spring in relieving the parts to release the brakes, after valve 9 is opened lever 74 swings on pivot 74$^a$ as a center and hence moves the upper end of this lever in normal position with reference to fixed shaft 80. In this release swing movement of lever 74, the upper end, that is the end encircling shaft 80, moves toward the left, again moving the upper end of valve operating lever 82′ to the left, releasing the pressure on valve 9, to permit such valve to close under spring 11, without, however, opening valve 8. The parts are now in the normal or initial positions.

What is claimed is:

1. A servo-brake mechanism for automobiles, including a brake, a power means subjected to pressure differences, a distributor for controlling such pressure differences, a manually-operable pedal, and an operating mechanism including two members having a common pivot and connected for bodily and relative pivotal movement beyond the pivot, one of such members being connected to the brake, and the other of such members being connected to the power mechanism, to the pedal, and to the distributor, said latter member having a limited pivot play to directly actuate the distributor in initial pedal movement.

2. A servo-brake mechanism for automobiles, including a brake, a power means subjected to pressure differences, a distributor for controlling such pressure differences, a manually-operable pedal, and an operating mechanism including two members having a common pivot and connected for bodily and relative pivotal movement beyond the pivot, one of such members being connected to the brake, and the other of such members being connected to the distributor, to the brake pedal, and to the power means, said latter member having initial pivotal movement on its connection with its companion member under pedal movement to operate the distributor and thereafter having pivotal movement on its connection with the brake pedal for simultaneous brake application and distributor control.

3. A servo-brake mechanism for automobiles, including a brake, a power means subjected to pressure differences, a distributor for controlling such pressure differences, a manually-operable pedal, and an operating mechanism including a lever and a link having a common pivot and a connection beyond the pivot to compel similar bodily movement, said lever having a limited play on the pivot and connected to and controlling the distributor through such play, a connection between the link and brake, a connection between the lever and pedal at a point on the lever between its pivot and its bodily connection with the link, and a connection between the lever and power means below the connection between the link and lever.

4. A servo-brake mechanism for automobiles, including a brake, a power means subjected to pressure differences, a distributor for controlling such pressure differences, a manually-operable pedal, and an operating mechanism including a link and a lever, the former directly connected to the brake and the latter directly connected to the pedal and to the power means, a common pivot for the link and lever on which the lever has limited play, a distributor-operating connection at the point of limited play of the lever, a unitary connection between the link and lever beyond the common pivot and on which the lever has relative pivotal movement, said lever in brake application under the power means pivoting first on said bodily connection with the link to set the distributor to control the power means, and thereafter on the connection with the pedal during power brake application.

5. A servo-brake mechanism for automobiles, including a brake, a power means subjected to pressure differences, a distributor for controlling such pressure differences, a manually-operable pedal, and an operating mechanism including a link and a lever, the former directly connected to the brake and the latter directly connected to the pedal and to the power means, a common pivot for the link and lever on which the lever has limited play, a distributor-operating connection at the point of limited play of the lever, a unitary connection between the link and lever beyond the common pivot and on which the lever has relative pivotal movement, said lever in brake application under the power means pivoting first on said bodily connection with the link to set the distributor to control the power means, and thereafter on the connection with the pedal during power brake application, the latter movement acting through the limited play of the lever on the common pivot to restore the distributor to neutral position.

6. In a servo-brake mechanism, a brake, power operating means subjected to pressure differences, a distributor for controlling such pressure differences, a manually-operable pedal, a lever system operated by the power means and connected to the brake, to the pedal, and to the distributor, the lever system being intially operated by the pedal to compel distributor action, the brake operation of the lever system following operation of the power means incident to the distributor action, such lever system transmitting a proportion of the braking force of the operating means through the pedal connection to the foot of the operator as an indicative reaction of braking force.

7. In a servo-brake for motor vehicles, a brake, the combination with rodding for the brake, of a brake lever; a distributor; an auxiliary source of energy controlled by said distributor; a member adapted to be moved by the action of the said source; and a swinging lever which is connected to the brake lever, to the brake rodding, to the distributor, and to the aforesaid member; the points of action of the various forces exerted upon the said swinging lever being so arranged that the resultant of the forces applied by the auxiliary source and the brake mechanism is applied at the point at which the brake lever is connected to the swinging lever, thereby to exert on said brake lever a reaction effort proportional to the braking force.

8. In a servo-brake for motor vehicles, a brake, the combination with rodding for the brakes, of a brake lever; a distributor; an auxiliary source of energy controlled by said distributor; a link; a fixed shaft, a swinging lever pivotally connected at one point to said link and pivoted upon the fixed shaft, said shaft passing through an aperture larger than the shaft provided in one end of the swinging lever so as to permit certain displacements of said swinging lever, a connection between the said link and the brake rodding; a connection between the apertured end of the swinging lever and the distributor; a connection between the brake lever and said swinging lever; a cylinder in which the degree of energy is controlled by the distributor; a piston in said cylinder subjected to the pressure differences therein; and a connection between said piston and the swinging lever.

9. In a servo-brake mechanism, a brake, power operating means therefor, a distributor including a suction valve for controlling suction influence on the power means and an atmospheric valve for controlling atmospheric admission to the power means, a manually operable pedal, and a lever system including a plurality of levers having a common pivot, said lever system being connected directly to the brake, to the power means, to the distributor, and to the pedal, one lever of such lever system being independently responsive to pedal movement to a degree to open the suction valve of the distributor for operating the power means, said lever system in movement responsive to the power means tending to apply the brake and simultaneously permit closing of such suction valve to thereby maintain a braking action.

10. In a servo-brake mechanism, a brake, power operating means therefor, a distributor including a suction valve for controlling suction influence on the power means and an atmospheric valve for controlling atmospheric admission to the power means and valve closing means, a manually operable pedal, and a lever system including a plurality of levers having a common pivot, such lever system being directly connected to the brake, to the power means, to the distributor, and to the pedal, one lever of such lever system being independently responsive to pedal movement to a degree to open the suction valve of the distributor for operating the power means, said lever system in movement responsive to the power means tending to apply the brake and simultaneously permit closing of such suction valve to thereby maintain a braking action, the movement of the lever system to permit closing of the suction valve restoring the parts for independent distributor control by the pedal through such lever system, whereby to permit further application of the brake through pedal movement.

11. In a servo-brake mechanism, a brake, power operating means therefor, a distributor including a suction valve for controlling suction influence on the power means and an atmospheric valve for controlling atmospheric admission to the power means, a manually operable pedal, and a lever system including a plurality of levers having a common pivot, said lever system being connected directly to the brake, to the power means, to the distributer, and to the pedal, one lever of such lever system being independently responsive to pedal movement to a degree to open the suction valve of the distributer for operating the power means, said lever system in movement responsive to the power means tending to apply the brake and simultaneously permit closing of such suction valve to thereby maintain a braking action, said lever system acting on release of the pedal to open the atmospheric valve to balance the power means and relieve the brake of power application.

12. In a servo-brake mechanism, a brake, power operating means therefor, a distributor including a suction valve for controlling suction influence on the power means and an atmospheric valve for controlling atmospheric admission to the power means, a manually operable pedal, and a lever system including a plurality of levers having a common pivot, said lever system being connected directly to the brake, to the power means, to the distributer, and to the pedal, one lever of such lever system being independently responsive to pedal movement to a degree to open the suction valve of the distributer for operating the power means, said lever system in movement responsive to the power means tending to apply the brake and simultaneously permit closing of such suction valve to thereby maintain a braking action, said lever system acting on release of the pedal to open the atmospheric valve to balance the power means and relieve the brake of power application, the brake release movement acting through such lever system to permit such atmospheric valve to close.

13. In a servo-brake mechanism, a brake, a power means subjected to pressure differences, a distributor for controlling such pressure differences, a manually operable pedal, a system of levers having a common floating pivot, one of said levers being connected to the pedal, to the distributor and to the power means and acting under pedal operation to actuate the distributor, with said common pivot as a fulcrum, the other of said levers being connected to the brake and operating relative to a fulcrum through bodily actuation of the common pivot under power means operation of the first mentioned pivot.

14. In a servo-brake mechanism, a brake, a power means subjected to pressure differences, a distributor for controlling said pressure differences, a manually operable pedal, independent levers having a common floating pivot, one of said levers being movable with respect to said pivot through actuation of the pedal to operate the distributor and being operated by the power means to bodily move the common pivot, the second of said levers being connected to the brake and operating the brake in the movement of such second lever responsive to the movement of the common pivot.

15. In a servo-brake mechanism, a brake, power means subjected to pressure differences, a distributor for controlling such pressure differences, a manually operable pedal, a system of levers having a common floating pivot, one of the levers of the system being operable relative to said pivot in the actuation of the pedal for controlling the distributor and another lever of the system being operable for setting the brake through bodily actuation of the floating pivot through a movement of the first mentioned lever responsive to the power means.

16. In a servo-brake mechanism, a brake, a power means subjected to pressure differences, a distributor for controlling such pressure differences, a manually operable pedal, a system of levers having a common floating pivot, one of said levers being operable relative to said pivot by the pedal to control the distributor, said lever being movable in the actuation of the power means to bodily move the floating pivot, and a second lever actuated in the bodily movement of the floating pivot to operate the brake.

17. In a servo-brake mechanism, a brake, a power means subjected to pressure differences, a distributor for controlling such pressure differences, a manually operable pedal, a lever system embodying two levers, one of which is connected to the pedal, to the distributor and to the power means, the other of which is connected to the brake, and a floating pivot connecting the levers and serving initially as a fulcrum for the first mentioned lever and thereafter as a means for communicating movement from the first mentioned lever to the second mentioned lever.

In testimony whereof I affix my signature.

ALBERT DEWANDRE.